US012031635B2

(12) United States Patent
Jost et al.

(10) Patent No.: US 12,031,635 B2
(45) Date of Patent: Jul. 9, 2024

(54) HYDRAULIC BUILT-IN VALVE

(71) Applicant: Moog Luxembourg S.a r.l., Bettembourg (LU)

(72) Inventors: Frank Jost, Fohren (DE); Jorg Wagner, Ralingen (DE); Marco Wiegandt, Boblingen (DE); Jason Le Gore, Bertrange (LU)

(73) Assignee: Moog Luxembourg S.a r.l., Bettembourg (LU)

( * ) Notice: Subject to any disclaimer, the term of this patent is extended or adjusted under 35 U.S.C. 154(b) by 0 days.

(21) Appl. No.: 18/020,378

(22) PCT Filed: Aug. 11, 2021

(86) PCT No.: PCT/EP2021/072373
§ 371 (c)(1),
(2) Date: Feb. 8, 2023

(87) PCT Pub. No.: WO2022/034133
PCT Pub. Date: Feb. 17, 2022

(65) Prior Publication Data
US 2023/0265929 A1    Aug. 24, 2023

(30) Foreign Application Priority Data

Aug. 12, 2020  (DE) .................. 102020210248.1

(51) Int. Cl.
*F16K 3/314* (2006.01)
*F16K 3/24* (2006.01)
*F16K 27/04* (2006.01)

(52) U.S. Cl.
CPC ............. *F16K 3/314* (2013.01); *F16K 3/246* (2013.01); *F16K 27/041* (2013.01); *F16K 2200/501* (2021.08)

(58) Field of Classification Search
CPC ......... F16K 3/314; F16K 3/246; F16K 27/041
See application file for complete search history.

(56) References Cited

U.S. PATENT DOCUMENTS 3,776,278 A  12/1973  Allen
6,003,551 A  12/1999  Wears
(Continued)

FOREIGN PATENT DOCUMENTS

DE   102018120555 A1   2/2020
EP       3514418 A1   7/2019
WO     2015117845 A1   8/2015

*Primary Examiner* — Kevin R Barss
(74) *Attorney, Agent, or Firm* — Harter Secrest & Emery LLP

(57) ABSTRACT

The present invention relates to a hydraulic built-in valve (100) for a valve block (10), comprising a sleeve (110) that is introducible into the valve block, and a closing element (130). The sleeve comprises a first end region (111) which is connectable to a control cover. The sleeve comprises a second end region (112) which is at the opposite end from the first end region and is introducible into the control cover, wherein the second end region has, in a frontal end, a frontal opening (114), and the sleeve forms, between the first end region and the second end region, a shell (117), having an outer side and an inner side, and the shell of the sleeve has a multiplicity of shell apertures (119) separated by shell webs (118). The closing element is arranged movably in the sleeve, wherein the closing element is movable between a first position and a second position, and wherein, in the first position, a fluidic connection between the frontal opening and the shell apertures is opened up, and, in the second position, a fluidic connection between the frontal opening and the shell apertures is closed off, wherein the shell apertures extend along the shell in the direction from the first (Continued)

end region to the second end region and form an aperture height, and the shell apertures have a height/width ratio of at least 3:1.

13 Claims, 3 Drawing Sheets

(56) References Cited

U.S. PATENT DOCUMENTS

| | | |
|---|---|---|
| 2004/0071044 A1 | 4/2004 | Kozyuk |
| 2004/0099832 A1 | 5/2004 | Gessaman |
| 2012/0152195 A1* | 6/2012 | Schulze .................. F01L 1/344 |
| | | 137/625.69 |
| 2015/0027547 A1* | 1/2015 | Arce-Gonzalez ... F15B 13/0406 |
| | | 137/884 |
| 2019/0195046 A1 | 6/2019 | Allen |
| 2021/0215019 A1* | 7/2021 | McLin .................. E21B 34/102 |

* cited by examiner

HYDRAULIC BUILT-IN VALVE

The present invention relates to a hydraulic built-in valve. It relates in particular to a two-way hydraulic built-in valve with a throttling and blocking function, in particular a servo and control cartridge. In addition, the present invention comprises a valve assembly with a hydraulic built-in valve according to the invention and a hydraulic system with a valve assembly.

Hydraulic built-in valves, in particular two-way hydraulic built-in valves in a seat design, also called cartridge valves, are known in the prior art and are widely used in hydraulic control technology as pressure, directional or shut-off valves.

A hydraulic built-in valve in a seat design is described, for example, in document EP 3 514 418 A1. Such a traditional two-way hydraulic built-in valve in a seat design (or cartridge valve) comprises a sleeve that is introducible into the valve block, and a closing element. The sleeve is fixedly connectable to the valve block at an upper end region. The sleeve has a lower end region which is at the opposite end from the upper end region, wherein the lower end region has a frontal opening in a frontal end and forms a plug ring, wherein the plug ring is introducible into a receiving bore of the valve block and has an outer circumference with a plug ring diameter. The sleeve forms a shell between the upper end region and the lower end region, wherein the shell has a plurality of radial openings separated by webs and the closing element is arranged in the sleeve. The closing element is movable between an open position and a blocking position, wherein in the open position, a fluidic connection between the frontal opening and the radial openings is opened and in the blocking position, the fluidic connection between the frontal opening and the radial openings is closed off. By means of the radial openings formed in the shell wall of the sleeve, which openings are generally designed as a transverse bore or as half-round milled-out portions, the fluid is conducted, when a closing element is in the open position, from an A-connection through the radial opening to a B-connection, or from the B-connection to the A-connection. In this design, it is disadvantageous that when the built-in valve is introduced, the radial openings of the sleeve can be arranged in the valve block in such a way that the radial openings are not situated in the optimal alignment with the B-connection for the fluid flow, whereby turbulence and/or friction occur at the radial openings, leading to pressure losses. In order to reduce these disturbances, additional alignment mechanisms are required, which make the design and production of the built-in valves more complicated and thus time-intensive and costly. Otherwise, a user must place the built-in valves during the installation in such a way that a maximum flow is achieved. This makes installation and/or maintenance more expensive. In addition, the radial openings have a passage opening or diameter, through which the fluid provided with a specific pressure via the B-connection or A-connection cannot pass without reducing pressure, so that furthermore, increased pressure losses and thus energy losses can occur than desired.

Proceeding therefrom, the present invention is based on the technical object of at least partially overcoming the disadvantages known in the prior art, in order to minimize the pressure losses at the hydraulic built-in valve.

This object is achieved by the subject matters of the independent claims, in particular by a hydraulic built-in valve and a valve assembly. Advantageous embodiments of the invention are described in the independent claims and in the following description.

According to a first aspect, the invention relates to a hydraulic built-in valve for a valve block. The hydraulic built-in valve comprises a sleeve that is introducible into the valve block, and a closing element. The sleeve comprises a first end region. The first end region is connectable to the valve block. The sleeve comprises a second end region which is at the opposite end from the first end region. The second end region has a frontal opening in a frontal end. The sleeve forms, between the first end region and the second end region, a shell having an outer side and an inner side. The shell of the sleeve has a multiplicity of shell apertures separated by shell webs. The closing element is movably arranged in the sleeve. Furthermore, the closing element is movable between a first position and a second position. In a first position of the closing element, a fluidic connection between the frontal opening and the shell apertures is opened, and, in the second position, a fluidic connection between the frontal opening and the shell apertures is closed off. The hydraulic built-in valve is characterized in that the shell apertures extend along the shell (in the direction) from the first end region to the second end region and form an aperture height, and the shell apertures have a height/width ratio of at least 3:1.

The present invention is based on the knowledge that there is a need for a hydraulic built-in valve which is characterized by a simplified installation which does not require orientation of the built-in valve relative to the B-connection in the control block, with improved flow conditions and fluid pressures.

In an advantageous manner, an installation of the hydraulic built-in valve in the valve block that requires conscious alignment is not required by the present invention, in particular thanks to the design of the shell apertures. As a result of the shell apertures, an improved flow through the hydraulic built-in valve is achieved, whereby the pressure losses through the hydraulic built-in valve having the same nominal valve size are improved and thus reduced by 40 to 50% compared to the comparable prior art.

Advantageous embodiments and developments emerge from the dependent claims and from the description with reference to the figures.

In a preferred embodiment, the shell apertures have a height/width ratio of more than 4:1. Advantageously, a greater independence of the flow value from the orientation of the hydraulic built-in valve relative to the B-connection in the control block is achieved by an increased height/width ratio, in particular of 4:1. However, embodiments known in the prior art have shown that an increased number of apertures can make the flow value worse because this also increases the number of webs. It was determined that, depending on the embodiment, the best value for the flow with shell apertures can be achieved with a height/width ratio between 3:1 and 5:1, predominantly in the range of 4:1. However, practical applicability is not a limitation for the use of a ratio of more than 3:1 to 5:1 in a preferred embodiment.

In one embodiment of the invention, the width of the shell webs is constant in the course starting from the outer side of the shell toward the inner side of the shell. The flow of the fluid is advantageously channeled, and improved flow conditions are produced, as a result of which reduced pressure losses occur.

In a further embodiment, the width of the shell apertures decreases in the course starting from the outer side of the shell toward the inner side of the shell. Advantageously, the width of the shell apertures tapers from the outer side of the shell toward the inner side of the shell. Thus, an improved channeling of the fluid and thus an improved flow of the fluid is advantageously achieved.

In a further embodiment, the width of the shell apertures on the inner side of the shell comprises at least one width in a range from 20 to 90%, preferably 60 to 80%, particularly preferably 73 to 80% of the shell apertures on the outer side of the shell. Hydraulic built-in valves known in the prior art have radial openings with a constant width in the course from the outer side of the shell to the inner side of the shell. As a result of the design according to the invention, the fluid flow is in each case more strongly channeled, thereby achieving an improved fluid flow resulting from the reduced pressure losses.

In a further embodiment, at least 8, preferably 10 or more shell apertures are formed in the shell next to one another in the circumferential direction of the shell. In addition, the shell webs separating the shell apertures form, in total, a width of at most 25% of the outer shell circumference, preferably 20% of the outer shell circumference. The inventive embodiment comprising at least 8, preferably 10 or more, shell apertures provides a higher independence in the alignment of the shell apertures relative to the corresponding connection in the valve block. Thus, the shell apertures do not have to be aligned in the valve block during the installation of the hydraulic built-in valve. Thus, no complex alignment mechanisms are required; the hydraulic built-in valve can thus be installed efficiently and cost-effectively. The number of shell apertures can be selected depending on the inner and outer diameters of the shell of the cylinder, in particular its design. In particular, the number of shell apertures can be determined by the width of the shell webs, and thus their strength, in conjunction with the inner and outer diameters of the shell of the cylinder.

In a further embodiment, the shell apertures in the shell form, in total, a width of at least 75% of the outer shell circumference, preferably 80% of the outer shell circumference. It can thus be ensured in an advantageous manner that a sufficiently large area of shell apertures is at the opposite end from the fluid-providing connection and the fluid is conducted into the hydraulic built-in valve with the lowest possible pressure losses.

In a further embodiment, the shell apertures are designed to taper trapezoidally in their extension from the outer side of the shell to the inner side of the shell. The trapezoidal design of the shell apertures has fluidic advantages over a rectangular design, for example. The trapezoidal design with a course that decreases from the outside to the inside is advantageous for the fluid flow. In addition, the trapezoidal shape is the variant of the narrowing aperture that is technically efficient and cost-effective to produce.

In a further embodiment, the closing element has a sealing surface for engagement in a complementary sealing surface formed in the sleeve, in order to close off a fluidic connection in the second position in interactive sealing. In some embodiments, the sealing surface is designed as an edge which forms a complementary seal with the sealing surface of the closing element. A leak-free seal is implemented via the sealing surface in order to prevent a passage of fluid in the second position of the closing element (blocking position).

In a further embodiment, the closing element has a tapered profile starting from the sealing surface of the closing element with a first diameter, via a second diameter in the center of extension of the closing element, to a third diameter. The first and third diameters of the closing element can each have different diameters. In an advantageous manner, a further flow space in the interior of the hydraulic built-in valve between the closing element and the valve sleeve is produced by the tapered profile of the closing element. Thus, an improved fluid flow through the hydraulic built-in valve can be achieved. In addition, by the tapered design of the closing element, turbulence is reduced and fluid is guided in an improved manner to the corresponding opening of the hydraulic built-in valve.

In a further embodiment, the sleeve has a fastening mechanism which is designed to receive the sleeve, in particular to fix the sleeve, in a control cover of the control block for controlling the hydraulic built-in valve. The sleeve is fixedly connected, for example axially and radially, to the control cover via the fastening mechanism. Via the connection to the control cover, the sleeve is also fixedly connected to the control block or the installation cavity. In one embodiment, the sleeve can be screwed to the control cover. Thus, all acting forces are absorbed in the cover and the loads on the webs are reduced. Thus, the width of the shell apertures can advantageously be maximized.

A second aspect of the present invention comprises a valve assembly with a valve block and a hydraulic built-in valve with a sleeve that is introducible into the valve block, and a closing element according to any of the preceding claims. The valve block has a stepped receiving opening in which the hydraulic built-in valve is arranged. The valve block has an A-connection assigned to the frontal opening and a B-connection freely assigned to the shell apertures. The possibility of free assignment of the shell apertures with respect to the B-connection eliminates the need for complicated alignment of the shell apertures.

In one embodiment according to the second aspect, a valve block with further connections, for example a C-connection, etc., can be provided.

In a further embodiment of the second aspect of the present invention, the shell apertures have an aperture height of at least 90% of the standardized drilling region of the B-connection. The drilling region of the B-connection has a specific height in accordance with the ISO 7368 standard. The aperture height of the shell apertures has at least 90% of the drilling region. Thus, turbulence is reduced at the opening of the shell apertures and the flow of the fluid into the hydraulic built-in valve is improved or pressure losses are reduced compared to the prior art. According to embodiments, the aperture height of the shell apertures can also depend on the standardized drilling region of further connections.

In a further embodiment of the second aspect of the present invention, the frontal opening has a first diameter which preferably corresponds to at least 90% of a second diameter of the introducible sleeve. The second diameter of the introducible sleeve is formed in the region, received in the A-connection, of the sleeve. Thus, the second diameter describes the outer diameter of the region, received by the A-termination, of the introducible sleeve. The shoulder in the block bore is no longer required thanks to the screwed-in (axially fixed) valve sleeve. Therefore, the frontal opening in the valve sleeve can be substantially larger than the corresponding standard (standardized diameter of the A-connection).

A further aspect of the present invention comprises a hydraulic system. The hydraulic system comprises at least one hydraulically driven component and a valve assembly according to any of the claims of the second aspect of the present invention for controlling and/or switching and/or blocking the hydraulically driven component.

The above embodiments and developments can be arbitrarily combined with one another insofar as is reasonable.

Further possible embodiments, developments, and implementations of the invention also include combinations, not explicitly mentioned, of features of the invention described above or below with respect to the exemplary embodiments. In particular, the person skilled in the art will also add individual aspects as an improvement or additions to the respective basic form of the present invention.

The present invention is explained in more detail below using the exemplary embodiments specified in schematic figures of the drawings. In the figures.

Figure 1:
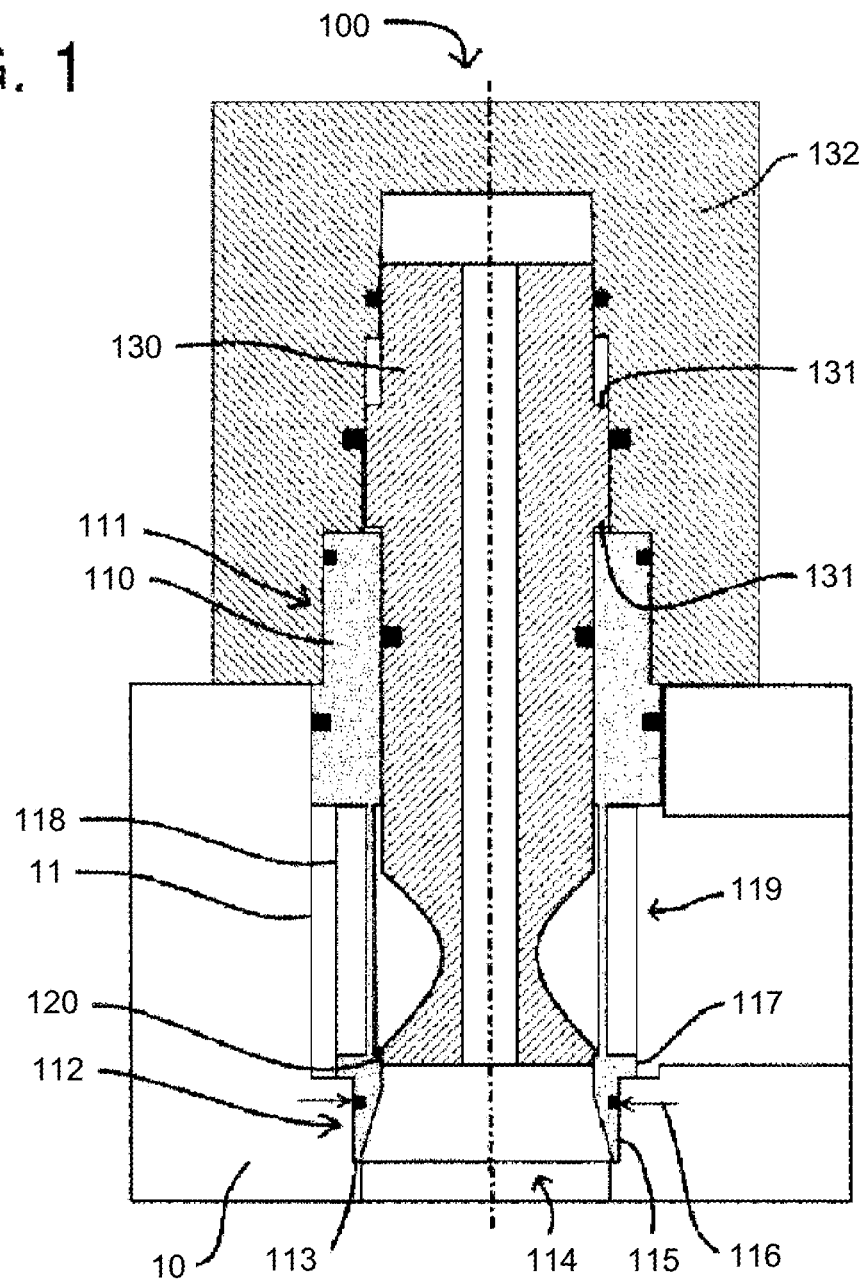
FIG. 1 is a schematic representation of an embodiment of a hydraulic built-in valve according to the present invention.

The accompanying drawings are intended to impart further understanding of embodiments of the invention. They illustrate embodiments and, in conjunction with the description, serve to explain principles and concepts of the invention. Other embodiments and many of the mentioned advantages result with regard to the drawings. The elements of the drawings are not necessarily shown to scale relative to one another.

In the figures of the drawing, identical, functionally identical, and identically acting elements, features and components are respectively to be provided with the same reference signs, unless stated otherwise.

FIG. 1 shows a schematic representation of an embodiment of a hydraulic built-in valve according to the present invention. Reference number 100 describes said hydraulic built-in valve. The hydraulic built-in valve 100 is shown inserted in the valve block 10 (shown by the dashed line). The hydraulic built-in valve 100 has a sleeve 110 that is introducible into the valve block 10. In addition, the hydraulic built-in valve 100 has a closing element 130. The closing element 130 is movably arranged in the sleeve 110. The sleeve 110 has a first end region 111. In addition, the sleeve 110 has a second end region 112 which is at the opposite end from the first end region 111. The second end region 112 has a frontal opening 114 in a frontal end 113. The frontal end 113 has a diameter to be received at the A-connection with a standardized diameter. In one embodiment, the frontal end 113 has a flow-optimized geometry with respect to the diameter at the A-connection.

The sleeve 110 forms a shell 117 between the first end region 111 and the second end region 112. The shell 117 has an outer side and an inner side. The shell 117 of the sleeve 110 has a multiplicity of shell apertures 119 separated by shell webs 118. A shell aperture 119 represents a fluid-conducting opening or connection between the outer side and the inner side of the shell 117 of the sleeve 110. A shell web 118 forms a separation between two adjacent shell apertures 119.

The closing element 130 movably arranged in the sleeve 110 is movable between a first position and a second position. In the first position of the closing element 130, a fluidic connection between the frontal opening 114 and the shell apertures 119 is opened. In this position of the closing element 130, a fluid flow from an A-connection to a B-connection or from a B-connection to an A-connection is possible. In the second position of the closing element 130, a fluidic connection between the frontal opening 114 and the shell apertures 119 is blocked. In this position of the closing element 130, no fluid flow from an A-connection to a B-connection or from a B-connection to an A-connection is possible.

In one embodiment, the closing element 130 comprises a tapered profile. In particular, the closing element 130 comprises a first diameter, which is designed to form a fluid-tight seal with the sealing surface 120 formed in a complementary manner in the sleeve 110. In the center of extension, the closing element comprises a second diameter, which is designed in such a way that it results in the tapered shape of the closing element 130. In particular, the second diameter is smaller than the first diameter for fluid-tight sealing. Continuing from the center of extension, the closing element 130 comprises a third diameter which is larger than the second diameter. In one embodiment, the first diameter and the third diameter of the closing element 130 can have different diameters. As a result of the tapered design of the closing element 130, more cross-sectional area is formed in the sleeve 110, as a result of which improved flow is achieved and pressure losses are minimized.

The shell apertures 119 in the shell 117 are designed to taper trapezoidally in their extension from the outer side of the shell to the inner side of the shell. In one embodiment, the width of the shell apertures 119 decreases in particular in the course starting from the outer side of the shell toward the inner side of the shell 117.

In one exemplary embodiment, the valve block 10 has a stepped receiving opening 11 in which the hydraulic built-in valve 100 is received and arranged. The stepped receiving opening 11 receives a diameter jump of the outer diameter of the sleeve 110. The sleeve can be introduced into the valve block 10 in a fluid-tight manner via the stepped receiving opening 11 and the diameter jump.

In a further exemplary embodiment, the sleeve 110 is fixedly connected to the control cover 132. The sleeve 110 is fixedly fixed to the control cover 132; for example, the sleeve is screwed in the control cover 132. An axial and radial connection between the sleeve 110 and the control cover 132 is produced. The sleeve 110 is fixedly connected to the control block (not shown), or the installation cavity, via the fixed connection between the sleeve 110 and the control cover 132. By connecting the sleeve 110 to the control cover 132, all acting forces are absorbed in the control cover 132.

Figure 2:
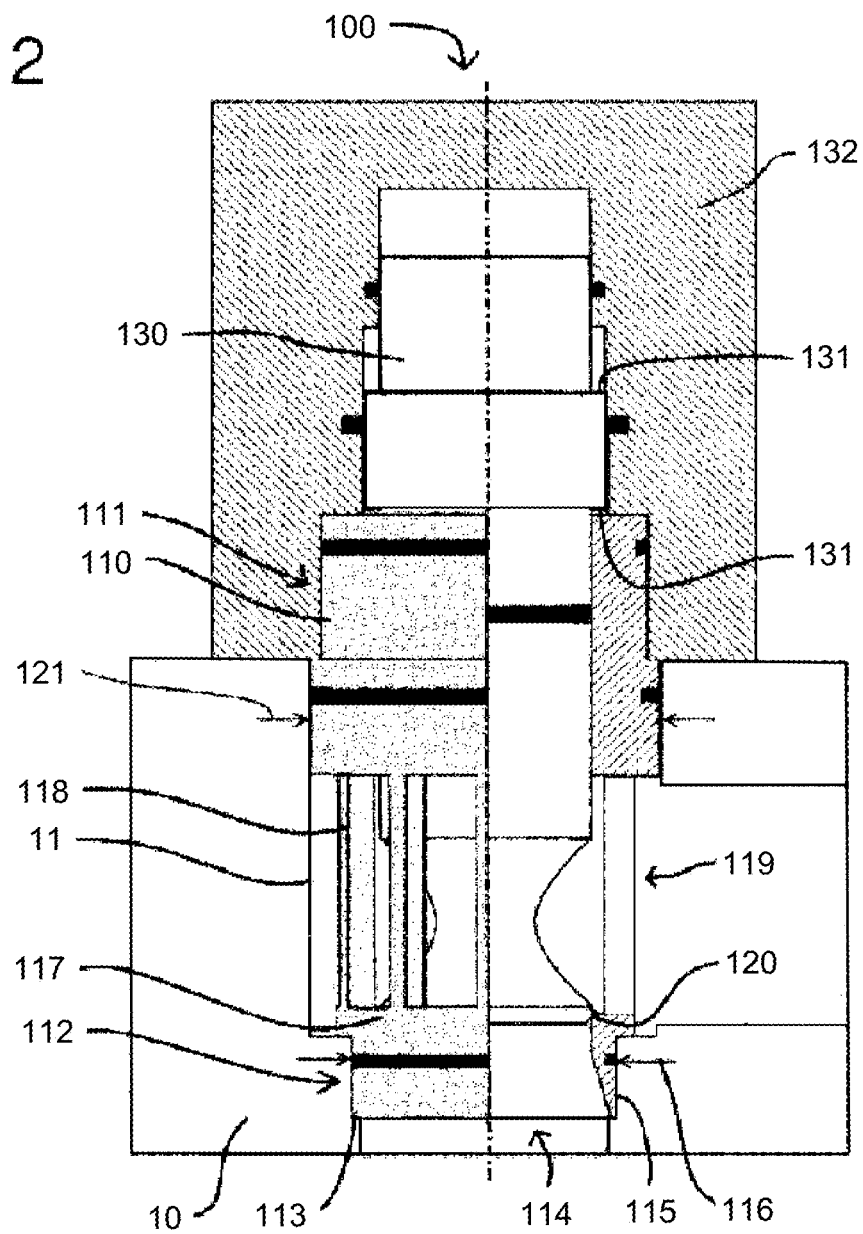
FIG. 2 is a schematic representation of a further embodiment of a hydraulic built-in valve according to the present invention with a sleeve shown in detail.

FIG. 2 shows a schematic representation of a further embodiment of a hydraulic built-in valve according to the present invention with a sleeve shown in detail. In the FIG. 2, the design of the shell apertures 119 and the shell webs 118 can be seen in a half section of the hydraulic built-in valve 110. In the shell 117, the shell apertures 119 are designed to taper trapezoidally in their extension from the outer side of the shell to the inner side of the shell. The fluid is conducted to the interior of the sleeve 110 via the trapezoidal shell apertures 119. In a preferred embodiment, the trapezoidal cross-section of the shell apertures 119 tapers from the outer side of the shell toward the inner side of the shell. The width of the shell webs is constant. Accordingly, the width of the shell apertures 119 decreases. The fluid is thus conducted from the large cross section of the B-connection into the hydraulic built-in valve 100. Alternatively, the fluid coming from the A-connection and from the small cross section in the hydraulic built-in valve 100 is conducted to the B-connection.

In one embodiment of the hydraulic built-in valve 100, the shell apertures 119 extend along the shell 117 from the first end region 111 to the second end region 112 and form an aperture height. In one embodiment, the shell apertures 119 have a ratio of height to width of at least 3:1, preferably of 4:1. Advantageously, the shell apertures 119 therefore do not have to be aligned exactly with respect to the bore of the B-connection in order to achieve an optimal fluid flow at a corresponding pressure. The aperture height of the shell apertures 119 ensures that the fluid is conducted into the interior of the hydraulic built-in valve 100, or can escape from the hydraulic built-in valve 100, via the shell apertures 119 at the necessary pressure. Manual placement by a user and/or the use of a placement mechanism is not necessary. In addition, built-in valves known in the prior art usually have only circular bores which produce the shell aperture. However, higher pressure losses occur with an increased number of circular bores. In order to minimize the pressure losses, four radial openings with an approximately square shape are provided and were designed to minimize the pressure losses. However, the limited number of radial openings makes it so that they are no longer independent of the B bore of the installation bore. A user must place the B-bore of the installation bore on the circumference in such a way that the B bore and the radial openings align. The advantageous design of the present invention renders this unnecessary because the area of the shell apertures provides an opening for the B-connection that is as large as possible. The design minimizes the pressure losses with simultaneous introduction into the B-connection with the greatest possible superposition of the shell apertures with the B-connection. In a further embodiment, the shell apertures can be divided by a web into identical or unequal parts in their longitudinal extension. In this case, the web can serve to support the shell webs. This is advantageous if the width of the shell apertures is maximized and the width of the shell webs is thus minimized in such a way that the latter could not absorb the forces of the fluid. The extension of the shell apertures along the shell from the first end region to the second end region can thus also comprise an interruption of the shell aperture by a web.

In one embodiment, the shell apertures 119 have an aperture height of at least 90% of the standardized drilling region (diameter) of the B-connection. In embodiments, the aperture height has at least 100% of the standardized drilling region of the B-connection. In an advantageous manner, a loss of fluid pressure at the transition from the B-connection into the hydraulic built-in valve 100 or vice versa can thus be reduced.

In FIG. 2, the stepped receiving opening 11 is shown. The receiving opening 11 receives a diameter jump in the outer diameter 121 of the sleeve 110. Furthermore, the second diameter 116 is shown in FIG. 2 as the outer diameter of the introducible sleeve 110. In the present case, the outer diameter 116 is designed as a plug ring. The outer diameter 116 of the introducible sleeve 110 extends over the region of the sleeve 110 which is received in the A-connection.

Figure 3:
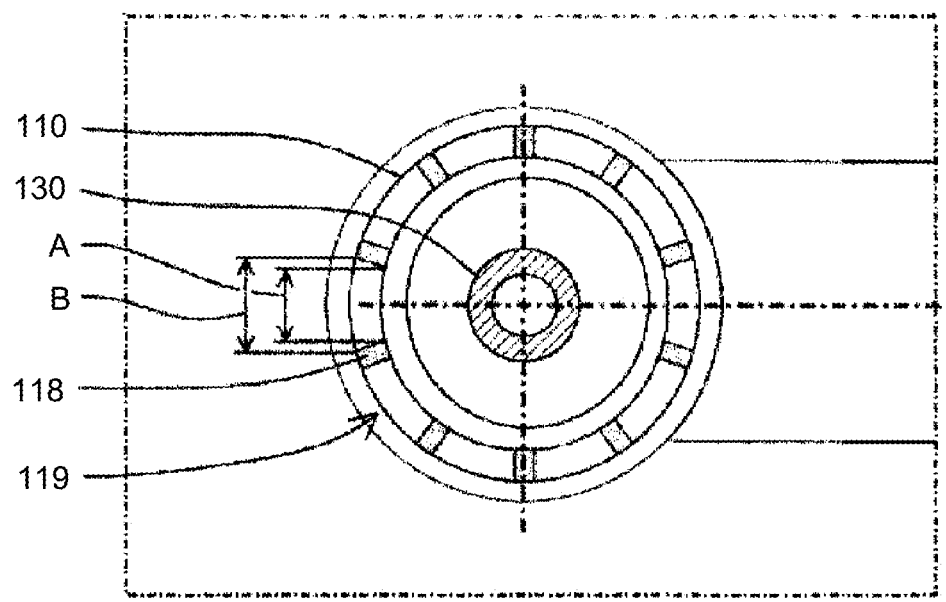
FIG. 3 is a schematic representation of an embodiment of the sleeve of the hydraulic built-in valve according to the present invention in plan view.

FIG. 3 shows a schematic representation of an embodiment of the sleeve of the hydraulic built-in valve according to the present invention in plan view. The sleeve 110 has a multiplicity of shell apertures 119, which are separated by shell webs 118. The shell apertures 119 in the shell 117 have, in total, a width of at least 75% of the outer shell circumference, preferably of 80% of the outer shell circumference. The width of the shell webs 118 is constant in the course from the outer side of the shell 117 to the inner side of the shell 117. The width of the shell apertures 119 tapers from a first width B on the outer side of the shell 117 to a second width A on the inner side of the shell 117. This results in the preferred trapezoidal cross-section.

Finally, it should be pointed out that the description of the invention and the exemplary embodiments are basically not to be understood as limiting with regard to a particular physical realization of the invention. All features explained and shown in conjunction with individual embodiments of the invention can be provided in different combinations in the subject matter according to the invention in order to simultaneously realize their advantageous effects.

The scope of protection of the present invention is defined by the claims and is not limited by the features explained in the description or shown in the figures.

LIST OF REFERENCE SIGNS

10 Valve block
11 Stepped receiving opening
100 Hydraulic built-in valve
110 Sleeve
111 First end region
112 Second end region
113 Frontal end
114 Frontal opening
115 Frontal-opening diameter
116 Sleeve diameter
117 Shell
118 Shell webs
119 Shell apertures
120 Sealing surface
121 Outer diameter
130 Closing element
131 Surfaces for control
132 Control cover
A Width of the shell apertures on the inner side of the shell
B Width of the shell apertures on the outer side of the shell

The invention claimed is:

1. A hydraulic built-in valve for a valve block, comprising:
a sleeve that is introducible into a valve block,
a closing element,
the sleeve comprising a first end region, and the first end region being connectable to the valve block,
the sleeve comprising a second end region which is at the opposite end from the first end region, the second end region having a frontal opening in a frontal end, and
the sleeve forming, between the first end region and the second end region, a shell having an outer side having an outer shell circumference and an inner side, and the shell of the sleeve having a multiplicity of shell apertures separated by shell webs, and
the closing element being movably arranged in the sleeve, the closing element being movable between a first position and a second position, and, in the first position, a fluidic connection between the frontal opening and the shell apertures being opened and, in the second position, the fluidic connection between the frontal opening and the shell apertures being closed off,
the shell apertures extending along the shell from the first end region to the second end region and forming an aperture height, and the shell apertures have a width and a height/width ratio of at least 3:1,
the shell apertures in the shell forming, in total, a width of at least 75% of the outer shell circumference, and
starting from a sealing surface of the closing element with a first diameter, the closing element having a tapered profile via a second diameter in the center of extension of the closing element to a third diameter, the second diameter being smaller than the first diameter, and the third diameter being larger than the second diameter.

2. The hydraulic built-in valve according to claim 1, wherein the width of the shell apertures decreases starting from the outer side of the shell toward the inner side of the shell.

3. The hydraulic built-in valve according to claim 1, wherein the shell apertures in the shell taper trapezoidally in their extension from the outer side of the shell to the inner side of the shell.

4. The hydraulic built-in valve according to claim 1, wherein the shell webs have a width and the width of the shell webs is constant from the outer side of the shell toward the inner side of the shell.

5. The hydraulic built-in valve according to claim 1, wherein the width of the shell apertures on the inner side of the shell is in a range from 20% to 90% of the width of the shell apertures on the outer side of the shell.

6. The hydraulic built-in valve according to claim 1, wherein at least 8 shell apertures are formed in the shell next to one another in the circumferential direction of the shell, and wherein the shell webs separating the shell apertures form, in total, a width of at most 25% of the outer shell circumference in the circumferential direction.

7. The hydraulic built-in valve according to claim 1, wherein the sealing surface of the closing element is operatively configured for engagement in a complementary sealing surface formed in the sleeve, in order to close off the fluidic connection in the second position in interactive sealing.

8. The hydraulic built-in valve according to claim 1, wherein the sleeve has a fastening mechanism which fixes the sleeve in a control cover of the control block for controlling the hydraulic built-in valve.

9. The hydraulic built-in valve according to claim 1, wherein the shell apertures in the shell form, in total, a width of at least 80% of the outer shell circumference.

10. A valve assembly comprising:
a valve block;
a hydraulic built-in valve having a sleeve that is introducible into the valve block;
the sleeve comprising a frontal opening in a frontal end, and a shell having an outer side and an inner side and a multiplicity of shell apertures between the inner side and the outer side;
a closing element being movable in the sleeve between a first position and a second position, and, in the first position, a fluidic connection between the frontal opening and the shell apertures being opened and, in the second position, the fluidic connection between the frontal opening and the shell apertures being closed off; and
wherein the valve block has a stepped receiving opening in which the hydraulic built-in valve is arranged and the valve block has an A-connection assigned to the frontal opening and a B-connection freely assigned to the shell apertures.

11. The valve assembly according to claim 10, wherein the shell apertures have an aperture height of at least 90% of a standardized drilling region of the B-connection.

12. The valve assembly according to claim 11, wherein the frontal opening has a first diameter which corresponds to at least 90% of a second diameter of the sleeve.

13. A valve system comprising at least one hydraulically driven component and a valve assembly according to claim 10 for controlling and/or switching and/or blocking the hydraulically driven component.

* * * * *